US008054822B2

(12) United States Patent
Hacena

(10) Patent No.: US 8,054,822 B2
(45) Date of Patent: Nov. 8, 2011

(54) SYNCHRONIZATION OF CALL TRAFFIC IN THE FORWARD DIRECTION OVER BACKHAUL LINKS

(75) Inventor: Farid Hacena, Aurora, IL (US)

(73) Assignee: Alcatel Lucent, Paris (FR)

( * ) Notice: Subject to any disclaimer, the term of this patent is extended or adjusted under 35 U.S.C. 154(b) by 955 days.

(21) Appl. No.: 12/021,163

(22) Filed: Jan. 28, 2008

(65) Prior Publication Data
US 2009/0190569 A1    Jul. 30, 2009

(51) Int. Cl.
*H04J 3/06* (2006.01)
(52) U.S. Cl. .................................... 370/350; 370/503
(58) Field of Classification Search .................. 370/350, 370/503, 508, 519, 328
See application file for complete search history.

(56) References Cited

U.S. PATENT DOCUMENTS

| 7,215,963 | B2 | 5/2007 | Hacena et al. | |
| 2003/0137972 | A1* | 7/2003 | Kowalewski | 370/351 |
| 2006/0154679 | A1* | 7/2006 | Chang | 455/502 |
| 2007/0121511 | A1* | 5/2007 | Morandin | 370/235 |
| 2007/0121523 | A1* | 5/2007 | Morandin | 370/252 |

FOREIGN PATENT DOCUMENTS

| GB | 2 321 829 A | 8/1998 |
| WO | WO9508899 A1 | 3/1995 |
| WO | WO2006096420 A1 | 9/2006 |

* cited by examiner

*Primary Examiner* — Brian Nguyen
(74) *Attorney, Agent, or Firm* — Duft Bornsen & Fishman LLP

(57) ABSTRACT

Communication networks and methods are disclosed for synchronizing call traffic in the forward direction over backhaul links. Within a communication network, a traffic processing unit is connected to base stations over a plurality of backhaul links. When the traffic processing unit receives reverse call traffic over the backhaul links, the traffic processing unit processes the reverse call traffic to determine a differential delay in receiving the reverse call traffic over the backhaul links. The traffic processing unit then receives forward call traffic. In response to receiving the forward call traffic, the traffic processing unit transmits the forward call traffic over the backhaul links to the base stations based on the differential delay determined for the reverse call traffic. The transmission of the forward call traffic in this manner substantially synchronizes receipt of the forward call traffic at the base stations.

20 Claims, 10 Drawing Sheets

SYNCHRONIZATION OF CALL TRAFFIC IN THE FORWARD DIRECTION OVER BACKHAUL LINKS

BACKGROUND OF THE INVENTION

1. Field of the Invention

The invention is related to the field of communication networks and, in particular, to systems and methods for synchronizing call traffic in the forward direction transmitted over backhaul links from a TPU (traffic processing unit) to base stations that are serving a mobile device in the downlink (i.e., forward direction).

2. Statement of the Problem

A typical wireless or mobile network includes a plurality of base stations that communicate via radio frequencies to mobile devices, such as cell phones. Each base station also connects to a traffic processing unit (TPU), which may be implemented in Mobile Switching Center (MSC), a Base Station Controller (BSC), or a similar switching office over a backhaul network. The mobile device transmits frames for a call (i.e., in the uplink direction) to the base station, and the base station transmits the frames, which is referred to herein as reverse call traffic, to the traffic processing unit over a backhaul link. The traffic processing unit thus receives this call traffic in the reverse direction (base station to TPU). The base station also receives call traffic for the call, which is referred to herein as forward call traffic, from the traffic processing unit over the backhaul link. The traffic processing unit thus transmits this call traffic in the forward direction (TPU to base station).

In a call involving a mobile device, the mobile device typically communicates with multiple base stations that are in range of the mobile device. If the user of the mobile device is speaking, the mobile device digitizes the voice and inserts the digitized voice into a sequence of frames. The mobile device then transmits the frames (in sequence) associated with the call to the multiple base stations in the reverse direction. Responsive to receiving the frames, each base station transmits the frames to the traffic processing unit according to a preset time interval (e.g., 20 ms) over its associated backhaul link. The traffic processing unit then processes the frames from the call to perform frame selection. For instance, for the first frame in the sequence, the traffic processing unit selects which of the frames received from the base stations is best, and the selected frame is used as the first frame in the sequence. For the second frame in the sequence, the traffic processing unit selects which of the frames received from the base stations is best, and the selected frame is used as the second frame in the sequence. This frame selection process is repeated for each frame of the call. The traffic processing unit then forwards the selected frames to the core network.

In the forward direction, the traffic processing unit receives frames for the call from the core network. These frames represent the voice of the other party to the call in full-duplex communications. The traffic processing unit then broadcasts each frame of the call to the base stations over their associated backhaul links as forward call traffic. The traffic processing unit broadcasts the frames to the base stations according to a preset time interval (e.g., 20 ms). Responsive to receiving the frames for the call from the traffic processing unit, each base station transmits the frames to the mobile device. The base stations are synchronized so that they transmit the same frame of the sequence at the same time. The mobile device then receives the frames and converts the digitized voice in the frames to analog voice signals, and provides the voice signals to the user so that the user may hear the spoken voice of the other party to the call.

The base stations serving the call may be communicating with the traffic processing unit over different types of backhaul links. A common type of backhaul link is a point-to-point T1/E1 link. However, other types of switched backhaul facilities may be used, such as an IP network. Also, different transport protocols may be used for transmission of frames, such as ATM, Frame relay, etc. Because different base stations serving the same call may use different backhaul links and/or transport protocols, there may be a differential delay between call traffic as transported over the backhaul links.

For reverse call traffic, the traffic processing unit handles the differential delay between the different backhaul links. In one example, the traffic processing unit performs frame selection at preset time intervals. If a frame for the call is late from one of the backhaul links, then that frame is not considered in the frame selection process. Other methods have been proposed to buffer the frames so that frame selection is performed on frames received over each of the backhaul links.

For forward call traffic, the base stations presently handle the differential delay between the different backhaul links. The traffic processing unit broadcasts frames for the call over each of the backhaul links to the base stations. The base stations then transmit the same frames in the sequence to the mobile according to a preset time interval. If one of the base stations receives frames in the sequence late (i.e., each frame is received after the preset time interval), then those frames are discarded. This is unfortunate as this base station may have the strongest signal with the mobile device over which to transmit the frames to the mobile device. Thus, it is presently a problem that there is differential delay in the backhaul links for forward call traffic.

SUMMARY OF THE SOLUTION

Embodiments of the invention solve the above and other related problems by determining the differential delay of the backhaul links based on reverse call traffic over the backhaul links, and then transmitting the forward call traffic over the backhaul links to the base stations based on the differential delay to substantially synchronize receipt of the forward call traffic at the base stations. The differential delay is taken into account when the forward call traffic is transmitted over the backhaul links. For instance, if one of the backhaul links has a 50 ms delay as compared to the other backhaul links, then forward call traffic will be transmitted over this backhaul link first, and then transmitted over the other backhaul links after a time period (i.e., after a 50 ms delay). Thus, by compensating for the delay of the backhaul links at the point of transmission of the forward call traffic, the forward call traffic is substantially synchronized over the backhaul links. As a result, the base stations should advantageously receive frames for a call at the same time, which allows the each of the base stations to transmit the frames for the call to the mobile device at the preset time interval. Late arriving frames will not have to be discarded as is presently performed, because no frames should be received late into a base station. There is much less of a risk that the base station having the strongest signal with a mobile device will not be able to transmit frames to the mobile device due to exorbitant delay in the backhaul link for that base station.

One embodiment comprises a traffic processing unit that synchronizes forward call traffic over backhaul links. The traffic processing unit receives reverse call traffic for a call over a plurality of backhaul links from a plurality of base stations serving a mobile device for a call. The traffic processing unit processes the reverse call traffic to determine a differential delay in receiving the reverse call traffic over the backhaul links. The traffic processing unit then receives forward call traffic for the call. In response to receiving the forward call traffic, the traffic processing unit transmits the forward call traffic over the backhaul links to the base stations based on the differential delay determined for the reverse call traffic. The transmission of the forward call traffic in this manner substantially synchronizes receipt of the forward call traffic at the base stations.

The invention may include other exemplary embodiments described below.

DESCRIPTION OF THE DRAWINGS

The same reference number represents the same element or same type of element on all drawings.

DETAILED DESCRIPTION OF THE INVENTION

FIGS. 1-10 and the following description depict specific exemplary embodiments of the invention to teach those skilled in the art how to make and use the invention. For the purpose of teaching inventive principles, some conventional aspects of the invention have been simplified or omitted. Those skilled in the art will appreciate variations from these embodiments that fall within the scope of the invention. Those skilled in the art will appreciate that the features described below can be combined in various ways to form multiple variations of the invention. As a result, the invention is not limited to the specific embodiments described below, but only by the claims and their equivalents.

Figure 1:
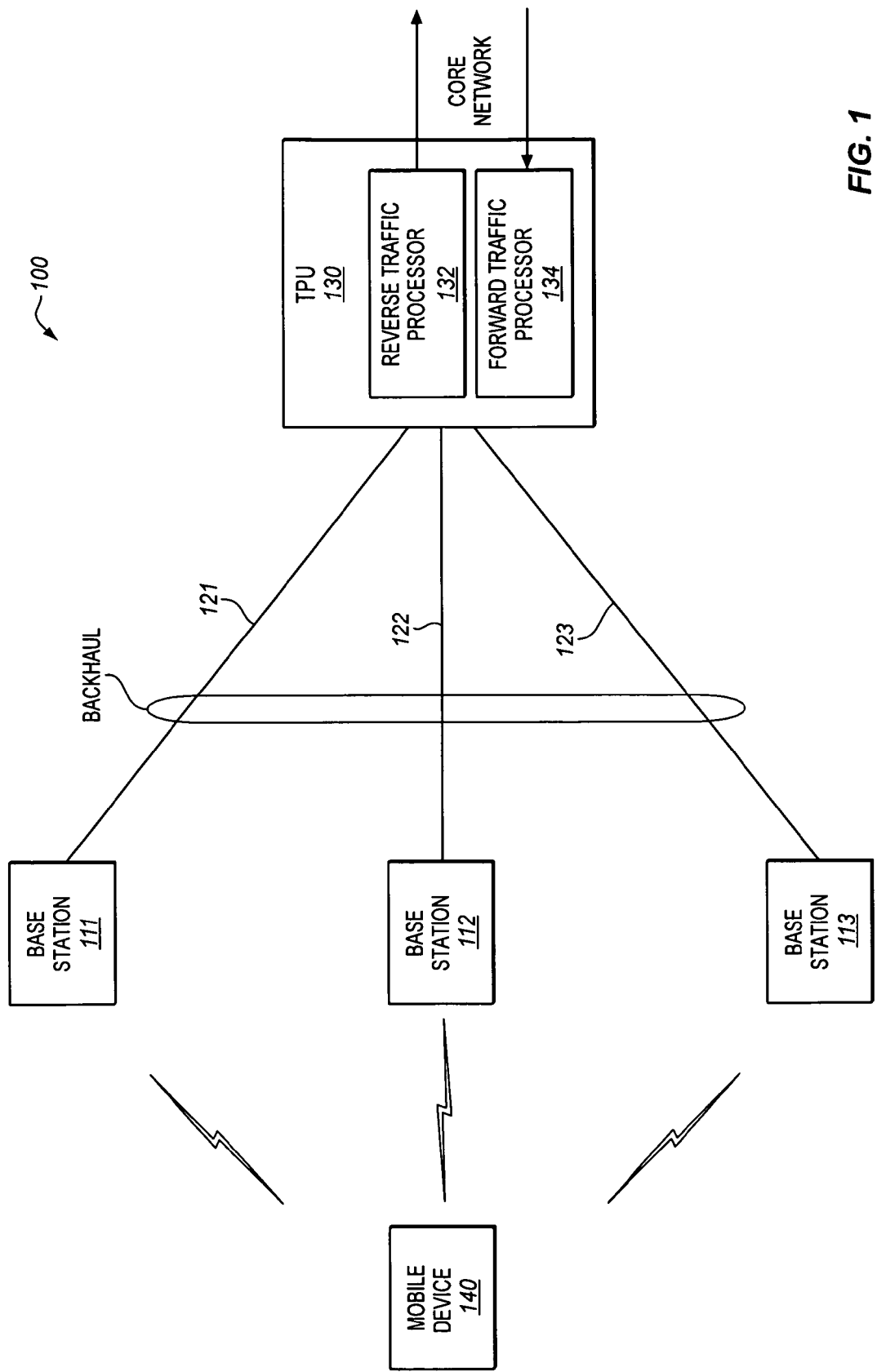
FIG. 1 illustrates a communication network in an exemplary embodiment of the invention.

FIG. 1 illustrates a communication network 100 in an exemplary embodiment of the invention. Communication network 100 includes a plurality of base stations 111-113 adapted to communicate with a traffic processing unit (TPU) 130 over backhaul links 121-123, respectively. Base stations 111-113 comprise any network nodes adapted to communicate with a mobile device 140 (and other mobile devices not shown) through wireless signals. Base stations 111-113 provide coverage areas referred to as "cells". One assumption for this embodiment is that the cells of base stations 111-113 overlap in such a way that the base stations 111-113 communicate with mobile device 140 simultaneously.

Traffic processing unit 130 comprises any system, server, or switch that is adapted to process reverse call traffic received from base stations 111-113 (and other base stations not shown) through a reverse traffic processor 132. Reverse traffic processor 132 may perform a frame selection process on the reverse call traffic, may decode the reverse call traffic (i.e., decode or demodulate the digitized voice), or may perform other functions. Traffic processing unit 130 is also adapted to process forward call traffic received from a core network that is destined for base stations 111-113 through a forward traffic processor 134. Forward traffic processor 134 may encode (i.e., encode or modulate voice signals into digitized voice), as well as perform other functions described below. Traffic processing unit 130 may be implemented in a Mobile Switching Center (MSC), in a Base Station Controller (BSC), or in another network element.

A backhaul link 121-123 comprises any communication path between a base station and a traffic processing unit. Any of backhaul links 121-123 may be point-to-point communication paths, such as a point-to-point T1/E1. Any of backhaul links 121-123 may also be a switched (or packet switched) communication path, such as over an IP network. The type of backhaul links implemented for each base station 111-113 may be a matter of design choice, may depend on the vendor for the base station, or may depend on other factors.

Mobile device 140 comprises any device adapted to communicate with base stations using wireless signals. Mobile device 140 may comprise a cellular phone, a PDA, etc. Mobile device 140 may also be a CDMA device, a WCDMA (3GGSM device), or a device that uses another type of wireless communication technique.

In FIG. 1, mobile device 140 is located within the coverage area of each of base stations 111-113. Those skilled in the art will appreciate that mobile device 140 may move to other coverage areas of other base stations (not shown), but the following embodiment illustrates the scenario where mobile device 140 is communicating with base stations 111-113. Base stations 111-113 each broadcast paging messages over paging channels within their cells. Mobile device 140 thus responds to the paging messages of each of base stations 111-113 to register with those base stations 111-113.

Assume that mobile device 140 initiates a call (or session) to another party (not shown), or receives a call from another party. When the user of mobile device 140 speaks, mobile device 140 digitizes the voice and inserts the digitized voice into frames. Mobile device 140 then transmits the frames to base stations 111-113 over the air interface.

Base station 111 receives the frames for the call, and transmits the frames to traffic processing unit 130 over backhaul link 121. The frames being transmitted from base station 111 (and other base stations) to traffic processing unit 130 are referred to as reverse call traffic. Base stations 112-113 operate in a similar manner to receive frames for the call from mobile device 140, and to transmit the frames to traffic processing unit 130 over backhaul links 122-123, respectively. Traffic processing unit 130 then processes the frames for the call, performs frame selection and other processes, and transmits the frames to the core network.

In the forward direction, traffic processing unit 130 receives frames for the call from the core network. These frames may represent the spoken voice of the other party to the call in full-duplex communications. Traffic processing unit 130 then transmits the frames over backhaul links 121-123 to base stations 111-113 according to the methods described below. The frames being transmitted from traffic processing unit 130 to base stations 111-113 (and other base stations) are referred to as forward call traffic. As previously mentioned, there may be different delays in each of backhaul links 121-123 so that the frames of a call are not received at the same time. The techniques described below compensate for the different delays in the backhaul links 121-123 so that the forward call traffic is substantially synchronized when received by base stations 111-113.

Figure 2:
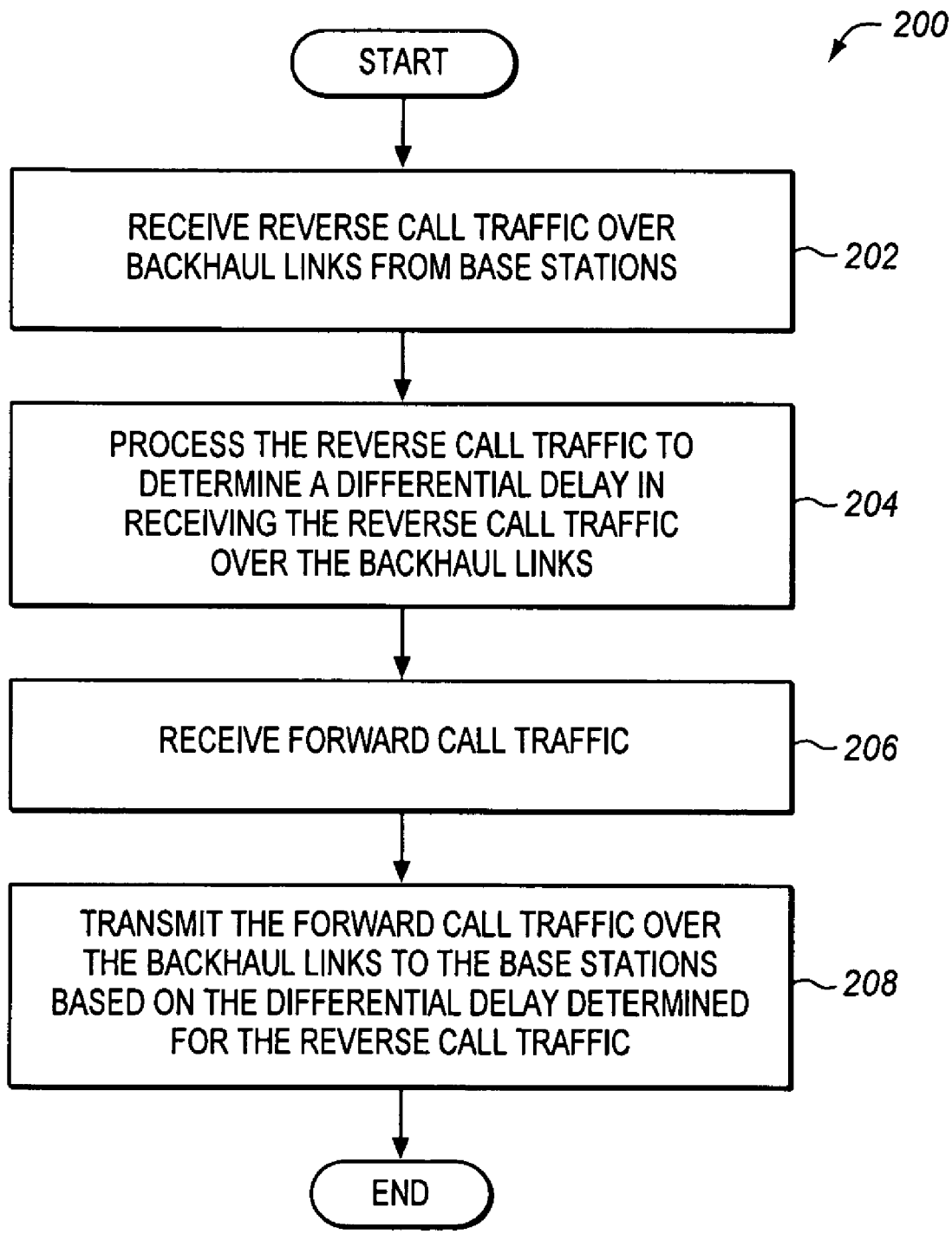
FIG. 2 is a flow chart illustrating a method of synchronizing forward call traffic over backhaul links in an exemplary embodiment of the invention.

FIG. 2 is a flow chart illustrating a method 200 of synchronizing forward call traffic over backhaul links 121-123 in an exemplary embodiment of the invention. The steps of method 200 will be described with reference to communication network 100 in FIG. 1. The steps of the flow chart in FIG. 2 are not all inclusive and may include other steps not shown.

In step 202, traffic processing unit 130 receives the reverse call traffic for the call (and possibly other calls) over backhaul links 121-123 from base stations 111-113 into reverse traffic processor 132. Reverse traffic processor 132 may perform frame selection processes or other processes on the reverse call traffic, and forward the reverse call traffic for the call to the core network. In addition, forward traffic processor 134 processes the reverse call traffic to determine a differential delay in receiving the reverse call traffic over the backhaul links 121-123 in step 204. Forward traffic processor 134 may process the reverse call traffic for only the call involving mobile device 140, or may additionally or alternatively process reverse call traffic for other calls. In processing the reverse call traffic, forward traffic processor 134 may process a receipt time of one or more reverse frames in the reverse call traffic for each of backhaul links 121-123. For instance, forward traffic processor 134 detects when a particular reverse frame for the call is received from base station 111 over backhaul link 121, and assigns a timestamp for receipt of the reverse frame. Forward traffic processor 134 also detects when the same reverse frame is received from base station 112 over backhaul link 122, and assigns another timestamp for receipt of the reverse frame. Further, forward traffic processor 134 detects when the same reverse frame is received from base station 113 over backhaul link 123, and assigns yet another timestamp for receipt of the reverse frame. Forward traffic processor 134 may then determine a delay for each of backhaul links 121-123 based on the timestamps, which reflects the differential delay of the backhaul links 121-123. Those skilled in the art will appreciate that one or more backhaul links 121-123 may have a delay of 0 ms, which is still considered a delay in this embodiment. Forward traffic processor 134 may then build a data structure that indicates the delay for each backhaul link 121-123.

When the delay for each backhaul link 121-123 has been determined, forward traffic processor 134 may use this information to synchronize the forward call traffic. In step 206, forward traffic processor 134 receives forward call traffic for the call (and possibly other calls). In step 208, forward traffic processor 134 transmits the forward call traffic over backhaul links 121-123 to base stations 111-113 based on the differential delay determined for the reverse call traffic. By transmitting the forward call traffic based on the differential delay for the backhaul links 121-123, receipt of the forward call traffic at base stations 111-113 is substantially synchronized.

Synchronizing the forward call traffic over backhaul links 121-123 provides advantages over prior backhaul techniques. First, synchronization of the forward call traffic is performed at traffic processing unit 130, so synchronization functionality is not needed at the base stations 111-113, or in mobile device 140. Secondly, because the forward frames (of the forward call traffic) are received concurrently at the base stations 111-113 over each backhaul link 121-123, there is little or no risk of late-arriving forward frames. Thus, each base station 111-113 will be able to transmit the forward frames to mobile device 140 at the preset time interval, and late-arriving frames will not have to be discarded. This almost assures that the base station 111-113 having the strongest signal with mobile device 140 will be transmitting forward frames to mobile device 140, and will not be discarding late-arriving frames due to excessive delays in its associated backhaul link.

Figure 3:
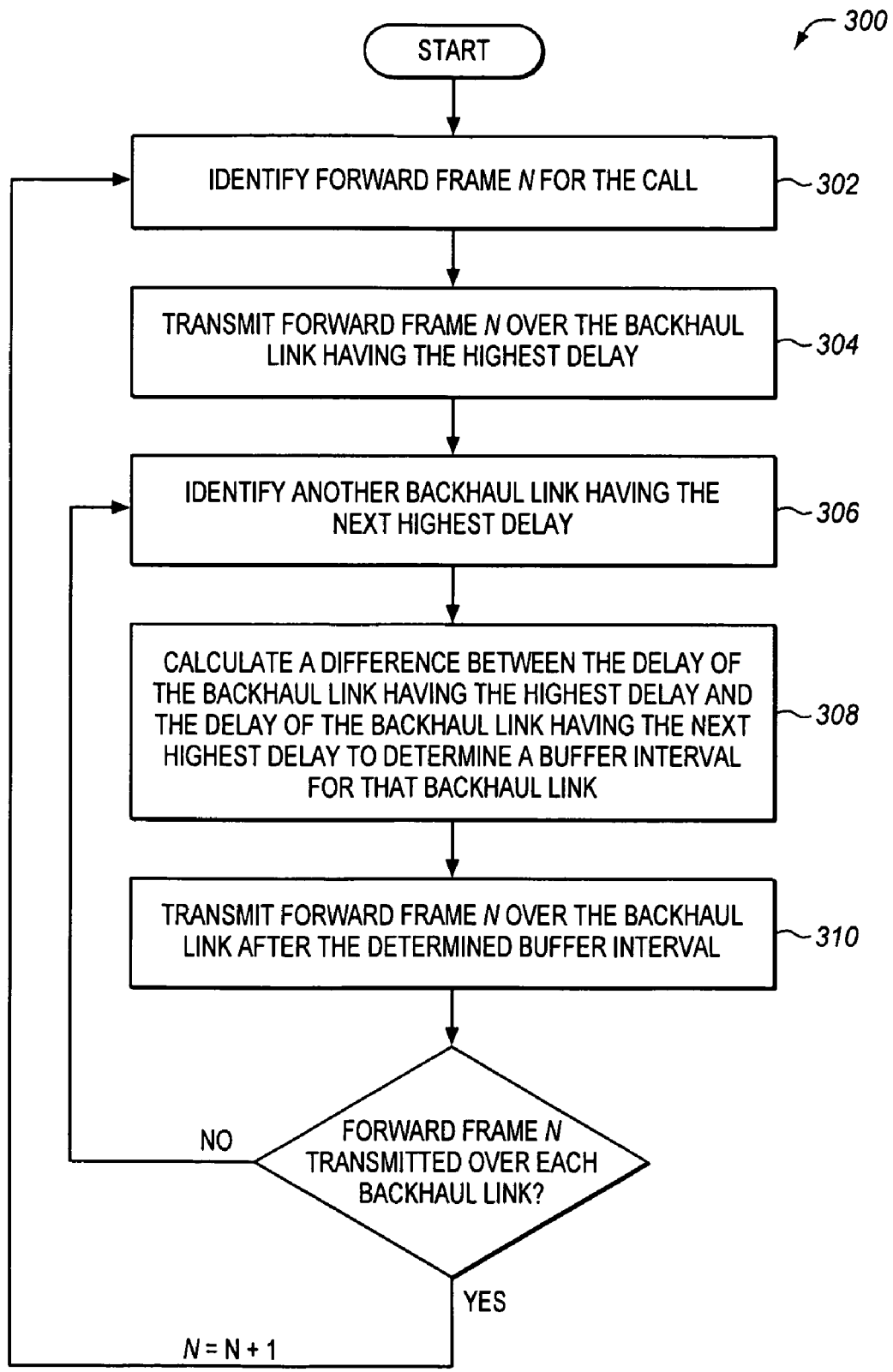
FIG. 3 is a flow chart illustrating a method of transmitting the forward call traffic over backhaul links in an exemplary embodiment of the invention.

There may be a variety of ways of transmitting the forward call traffic over backhaul links 121-123 to base stations 111-113 based on the differential delay, one if which is illustrated in FIG. 3. FIG. 3 is a flow chart illustrating a method 300 of transmitting the forward call traffic over backhaul links 121-123 in an exemplary embodiment of the invention. Responsive to receiving forward call traffic for the call, forward traffic processor 134 identifies a forward frame in the forward call traffic in step 302 (referred to as forward frame N in FIG. 3). Forward traffic processor 134 then identifies which one of the backhaul links 121-123 has the highest delay. For example, if forward traffic processor 134 generates a data structure when processing the reverse call traffic that indicates the delay over each of the backhaul links 121-123, then forward traffic processor 134 may determine which of the backhaul links 121-123 has the highest delay by referring to the data structure. In step 304, forward traffic processor 134 transmits the forward frame over the backhaul link having the highest delay. Thus, the forward frame is transmitted first over the backhaul link having the highest delay.

In step 306, forward traffic processor 134 identifies another backhaul link having the next highest delay. Again, forward traffic processor 134 may refer to the data structure to determine which backhaul link has the next highest delay. In step 308, forward traffic processor 134 calculates a difference between the backhaul link having the highest delay and the backhaul link having the next highest delay. The difference between the two delays is referred to as a buffer interval. In step 310, forward traffic processor 134 transmits the forward frame over the backhaul link having the next highest delay after the determined buffer interval for that backhaul link. Those skilled in the art will appreciate that the transmit time for the forward frame may not be precisely at the end of the time interval. For instance, forward traffic processor 134 transmits forward frames according to a preset time interval, such as 20 ms. If the delay of a backhaul link is determined to be 30 ms, then forward traffic processor 134 may transmit the forward frame at the next clock interval, which is at 40 ms. If the delay of a backhaul link is determined to be 45 ms, then forward traffic processor 134 may transmit the forward frame at the next clock interval, which is at 60 ms. In any event, the transmit times of the forward frames are adjusted so that they are received substantially concurrently at base stations 111-113.

If there are more base stations involved in the call, and consequently more backhaul links, then forward traffic processor 134 repeats steps 306-310 for the backhaul link having the next highest delay. If the forward frame has been transmitted over each of the backhaul links, then forward traffic processor 134 identifies the next forward frame (N=N+1) for the call, and repeats method 300.

Figure 4:
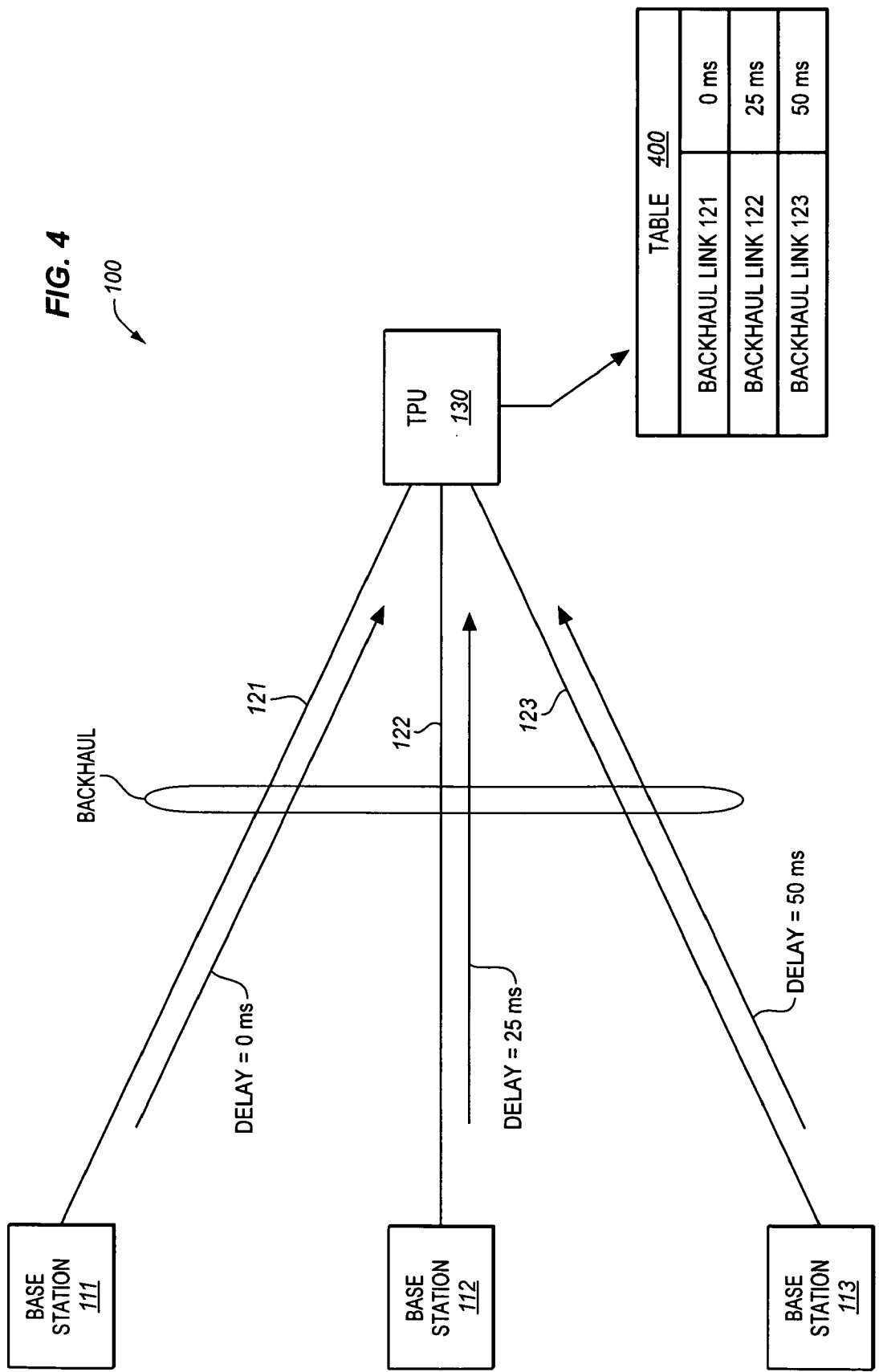
FIG. 4 illustrates a traffic processing unit receiving reverse call traffic over backhaul links in an exemplary embodiment of the invention.

The following provides an example of synchronizing the forward call traffic as described above. FIG. 4 illustrates traffic processing unit 130 receiving reverse call traffic over backhaul links 121-123 in an exemplary embodiment of the invention. Again, each of base stations 111-113 transmits the same reverse call traffic for the call over backhaul links 121-123 to traffic processing unit 130. In this embodiment, when transporting the reverse call traffic, backhaul link 123 has the highest delay of 50 ms, backhaul link 122 has the next highest delay of 25 ms, and backhaul link 121 has the next highest delay (or the lowest delay) of 0 ms. Based on these delays, reverse frames over backhaul link 121 are received first in traffic processing unit 130, reverse frames over backhaul link 122 are received next after 25 ms, and reverse frames over backhaul link 123 are received next after another 25 ms. Traffic processing unit 130 processes the receipt times of the reverse frames to determine the delay for each backhaul link 121-123. Traffic processing unit 130 then generates table 400 which indicates the delay for each backhaul link 121-123.

Figure 5:
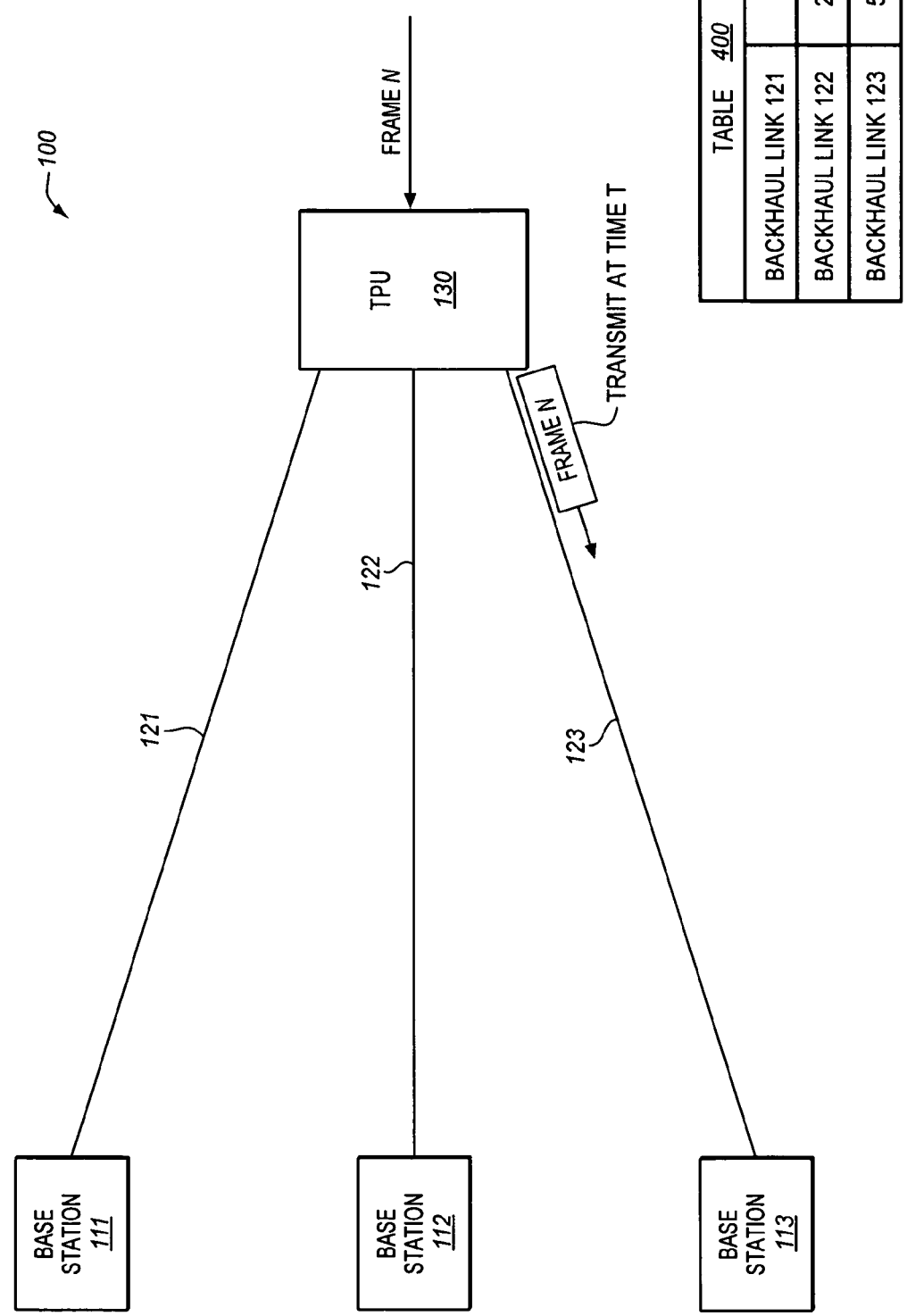
FIGS. 5-8 illustrate a traffic processing unit transmitting forward call traffic over backhaul links in an exemplary embodiment of the invention.

FIGS. 5-8 illustrate traffic processing unit 130 transmitting forward call traffic over backhaul links 121-123 in an exemplary embodiment of the invention. In FIG. 5, traffic processing unit 130 receives the forward call traffic from the core network, and more particularly receives forward frame N of the forward call traffic. Responsive to receiving forward frame N, traffic processing unit 130 processes table 400 to identify the backhaul link having the highest delay. In this embodiment, backhaul link 123 has the highest delay (50 ms), so traffic processing unit 130 transmits forward frame N over backhaul link 123 first at time T.

Figure 6:
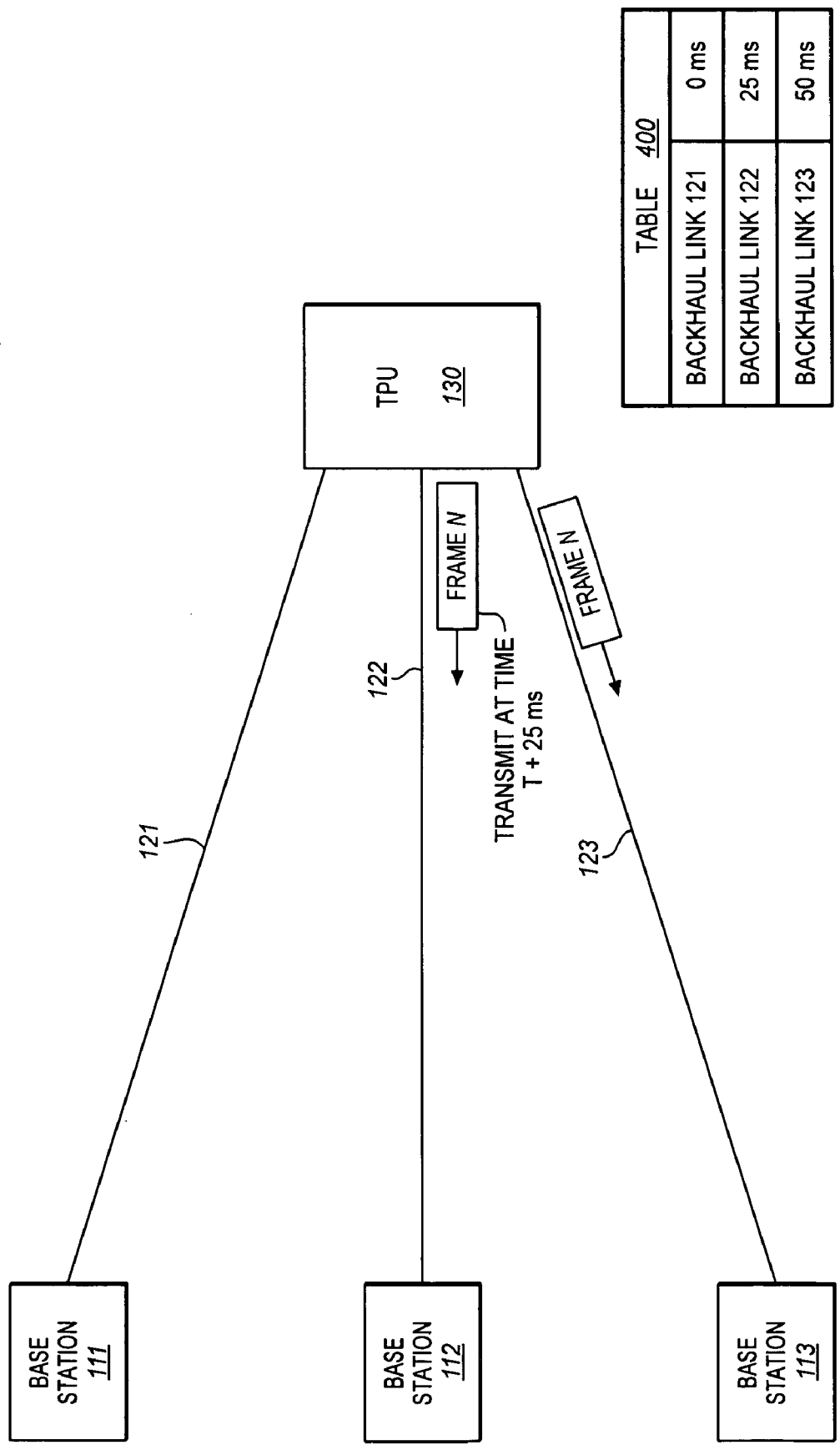

Traffic processing unit 130 processes table 400 to identify another backhaul link having the next highest delay. In this embodiment, backhaul link 122 has the next highest delay (25 ms). Traffic processing unit 130 then calculates the difference between the delay of backhaul link 123 (50 ms) and the delay of backhaul link 122 (25 ms) to determine a buffer interval for backhaul link 122. The buffer interval for backhaul link 122 in this embodiment is 25 ms, so traffic processing unit 130 buffers forward frame N for 25 ms. After the buffer interval, traffic processing unit 130 transmits forward frame N over backhaul link 122 at time T+25 ms. FIG. 6 illustrates traffic processing unit 130 transmitting forward frame N over backhaul link 122.

Figure 7:
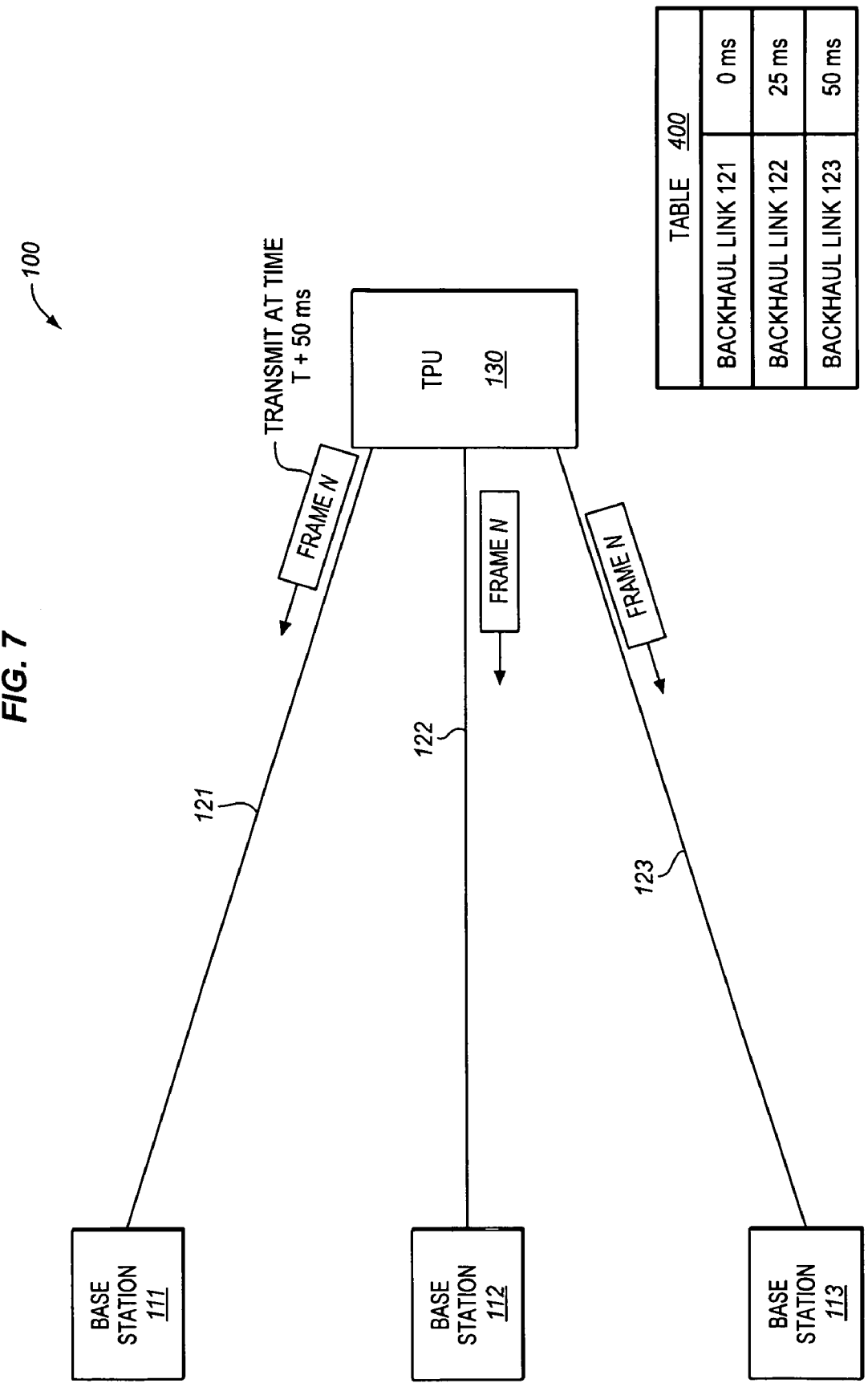

Traffic processing unit 130 processes table 400 to identify another backhaul link having the next highest delay. In this embodiment, backhaul link 121 has the next highest delay (0 ms). Traffic processing unit 130 then calculates the difference between the delay of backhaul link 123 (50 ms) and the delay of backhaul link 121 (0 ms) to determine a buffer interval for backhaul link 121. The buffer interval for backhaul link 121 in this embodiment is 50 ms, so traffic processing unit 130 buffers forward frame N for 50 ms. After the buffer interval, traffic processing unit 130 transmits forward frame N over backhaul link 121 at time T+50 ms. FIG. 7 illustrates traffic processing unit 130 transmitting forward frame N over backhaul link 121.

Again, those skilled in the art will appreciate that the transmit time for forward frame N may not be precisely at the end of the buffer interval (T+25 ms or T+50 ms). Because traffic processing unit 130 may transmit forward frames according to a preset time interval, such as 20 ms, traffic processing unit 130 may transmit forward frame N over backhaul link 122 at the next clock interval, which is at 40 ms. Traffic processing unit 130 may also transmit forward frame N over backhaul link 121 at the next clock interval, which is at 60 ms.

Figure 8:
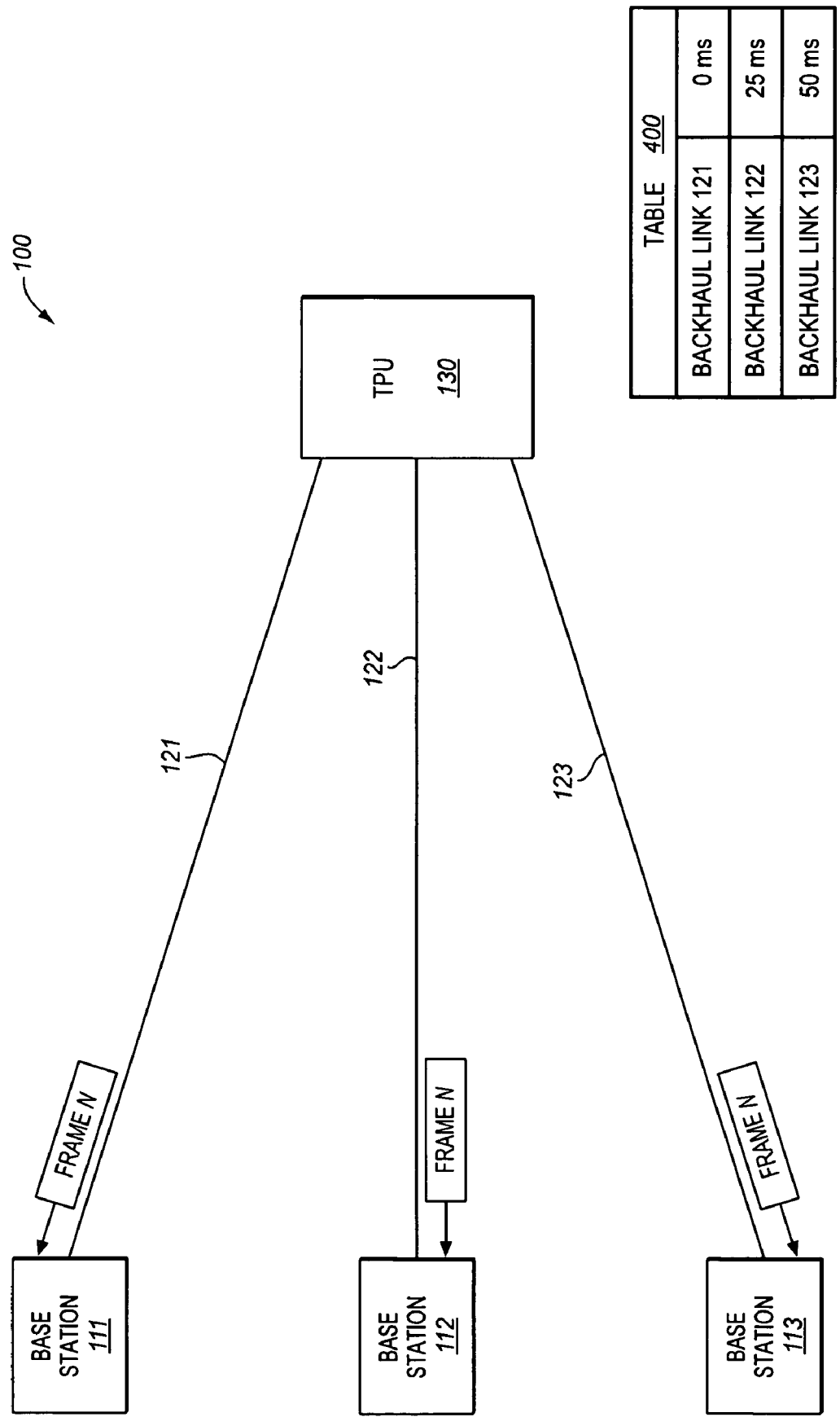

Because the delay for each backhaul link 121-123 was taken into account in traffic processing unit 130 when transmitting forward frame N, each base station 111-113 should receive forward frame N at substantially the same time. FIG. 8 illustrates base stations 111-113 receiving forward frame N at the same time. Consequently, each base station 111-113 will be able to transmit forward frame N to mobile device 140 (see FIG. 1) at the same preset time interval. According to prior backhaul techniques, forward frame N would be received 25 ms late in base station 112, and 50 ms late in base station 113 because of the delay in backhaul links 122-123, respectively. There was a risk that a late arriving forward frame N in one or both of base stations 112-113 would be discarded. According to the example provided above, there is little or no risk that forward frame N would be discarded by any of base stations 111-113 because it is received at substantially the same time in each of the base stations.

Figure 9:
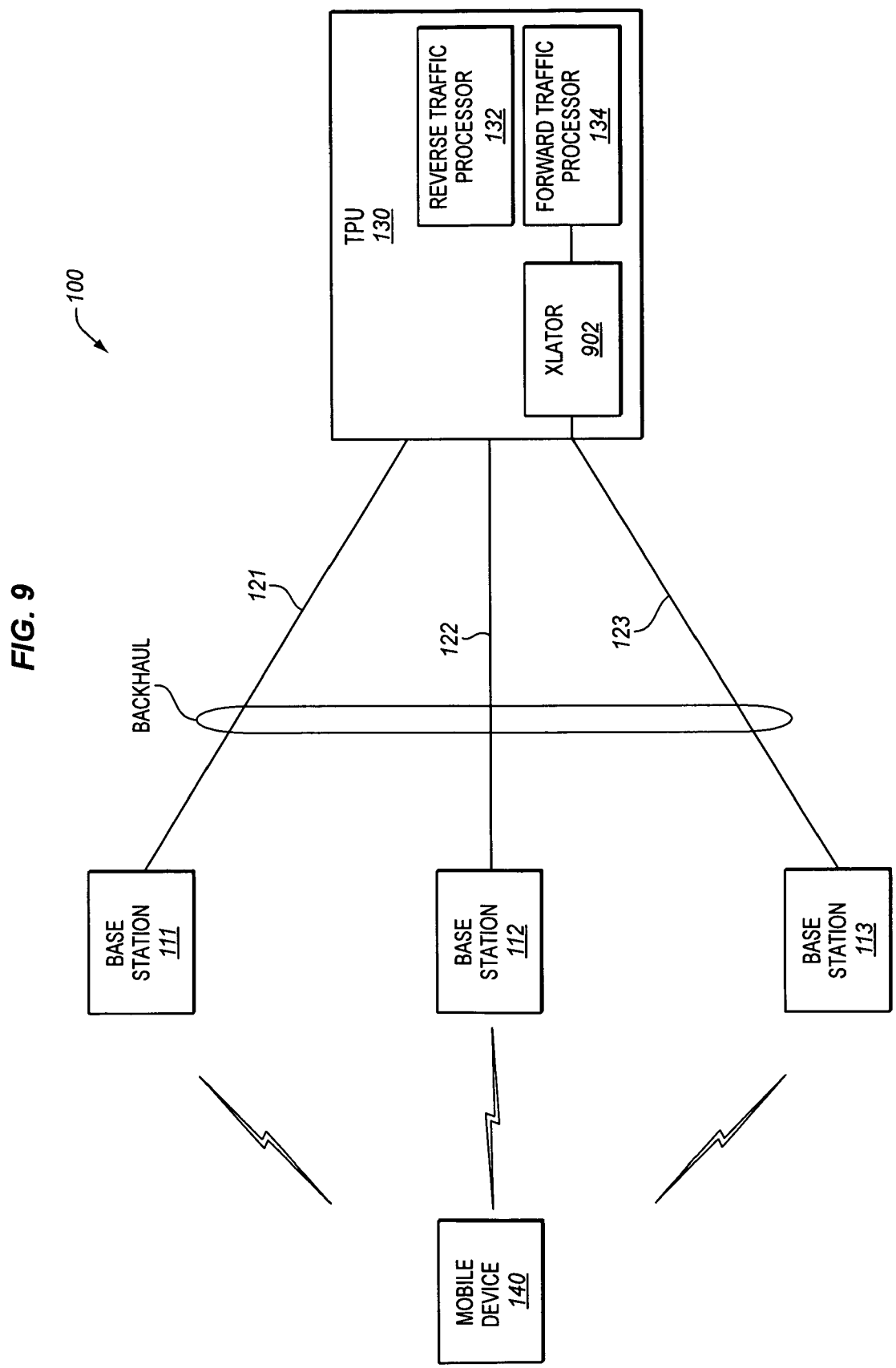
FIG. 9 illustrates a traffic processing unit further including a translator system in an exemplary embodiment of the invention.

In another embodiment, traffic processing unit 130 may include a translator system that is adapted to convert forward call traffic from one format (or protocol) to another format prior to being transmitted over one or more backhaul links 121-123. FIG. 9 illustrates traffic processing unit 130 further including a translator system (XLATOR) 902 in an exemplary embodiment. Although translator system 902 is shown as connected to backhaul link 123, translator system 902 may be connected to any of backhaul links 121-123. Also, although translator system 902 is shown as being integrated within traffic processing unit 130, translator system 902 may be a stand alone element, or may be integrated in another network node.

One assumption for this embodiment is that forward traffic processor 134 is adapted to transmit forward call traffic over backhaul links 121-123 according to a first format. Another assumption is that base stations 111-112 are adapted to process traffic in the first format, but that base station 113 is adapted to process traffic in a second format that is different than the first format. For instance, traffic processing system 130 and base stations 111-112 may be from a first vendor that uses the first format, such as a proprietary format. Base station 113 may be from a second vendor (that is different than the first vendor) that uses the second format, which may be another proprietary format, may be an Inter-vendor Operating System (IOS) format, or another format.

Figure 10:
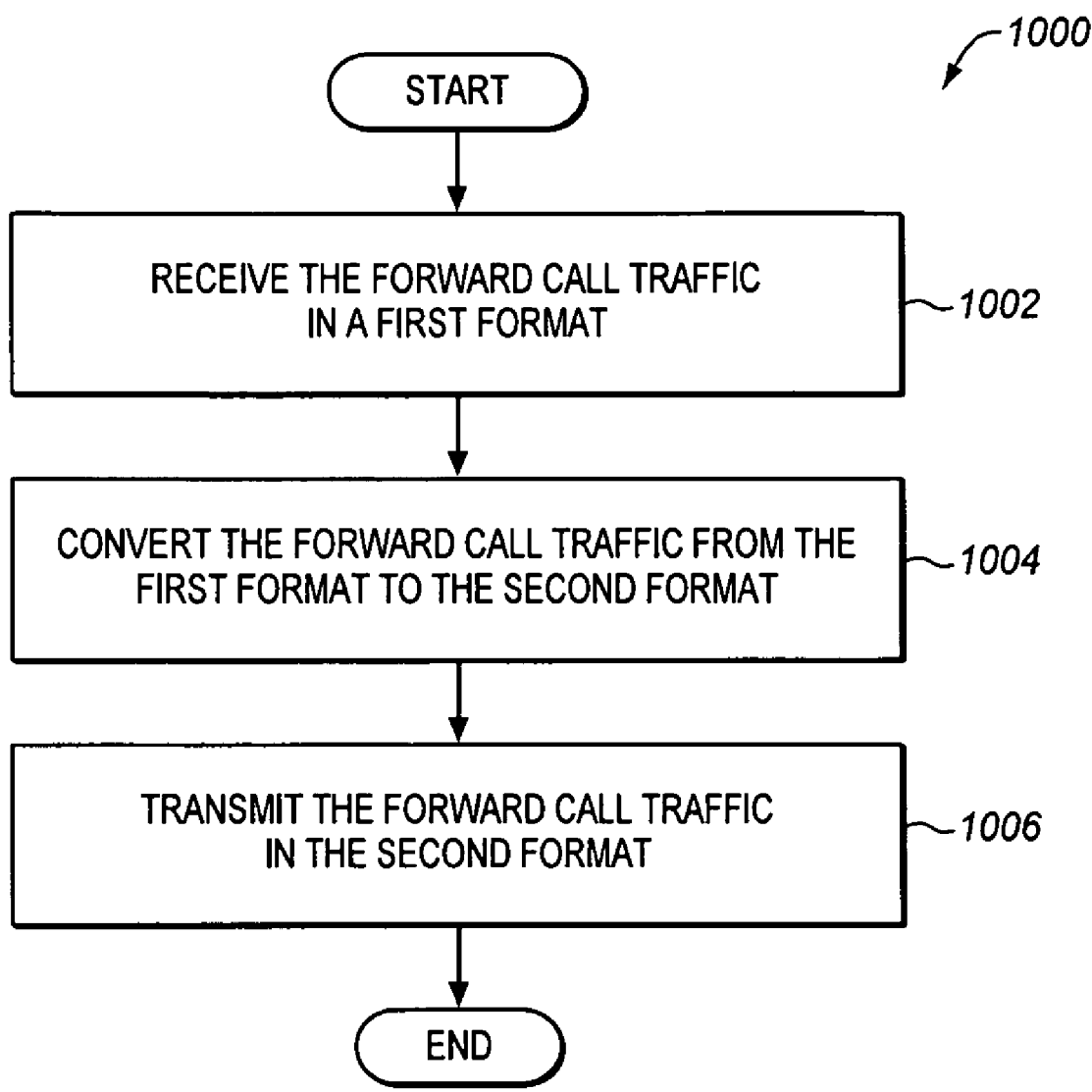
FIG. 10 is a flow chart illustrating a method of translating forward call traffic in an exemplary embodiment of the invention.

When forward traffic processor 134 transmits the forward call traffic, such as in step 208 of FIG. 2, forward traffic processor 134 transmits the forward call traffic in the first format over backhaul link 121, and transmits the forward call traffic in the first format over backhaul link 122. Because base station 113 is not able to interpret the first format, forward traffic processor 134 transmits the forward call traffic in the first format to translator system 902. FIG. 10 is a flow chart illustrating a method 1000 of translating forward call traffic in an exemplary embodiment of the invention.

In step 1002, translator system 902 receives the forward call traffic in the first format. In step 1004, translator system 902 converts the forward call traffic from the first format to the second format that may be interpreted by base station 113. For example, translator system 902 may convert the forward call traffic from a proprietary format to an IOS format. In another example, translator system 902 may convert the forward call traffic from an IOS format to a proprietary format. In step 1006, translator system 902 transmits the forward call traffic in the second format to base station 113 over backhaul link 123.

The addition of translator system 902 advantageously allows service providers to install base stations from different vendors. The ability to add base stations from different vendors provides flexibility to service providers and reduces costs. Even if the base stations do not interpret traffic in the same format as traffic processing system 130, translator system 902 is able to provide the appropriate conversions so that traffic processing system 130 is able to communicate with the base stations.

Those skilled in the art will appreciate that forward traffic processor 134 is able to take into account the additional delay of the translator system 902 when determining the delay for backhaul link 123. Thus, forward frames that are being converted from one format to another will not be late to base station 113.

Although specific embodiments were described herein, the scope of the invention is not limited to those specific embodiments. The scope of the invention is defined by the following claims and any equivalents thereof.

I claim:

1. A method of synchronizing forward call traffic over backhaul links, the method comprising:
   receiving reverse call traffic over a plurality of backhaul links from a plurality of base stations serving a mobile device;
   processing the reverse call traffic to determine a differential delay in receiving the reverse call traffic over the backhaul links;
   receiving forward call traffic; and
   transmitting the forward call traffic over the backhaul links to the base stations based on the differential delay determined for the reverse call traffic to substantially synchronize receipt of the forward call traffic at the base stations.

2. The method of claim 1 wherein processing the reverse call traffic to determine a differential delay in the receiving the reverse call traffic over the backhaul links comprises:
   processing a receipt time of a reverse frame in the reverse call traffic for each of the backhaul links; and
   determining a delay for each of the backhaul links based on the receipt times of the reverse frame.

3. The method of claim 2 wherein transmitting the forward call traffic over the backhaul links to the base stations based on the differential delay comprises:
   identifying a forward frame in the forward call traffic; and
   transmitting the forward frame over a first one of the backhaul links having the highest delay.

4. The method of claim 3 further comprising:
   identifying a second one of the backhaul links having the next highest delay;
   calculating a difference between the delay of the first one of the backhaul links having the highest delay and the delay of the second one of the backhaul links having the next highest delay to determine a buffer interval for the second one of the backhaul links; and
   transmitting the forward frame over the second one of the backhaul links after the determined buffer interval.

5. The method of claim 4 further comprising:
   identifying a third one of the backhaul links having the third highest delay;
   calculating a difference between the delay of the first one of the backhaul links having the highest delay and the delay of the third one of the backhaul links having the third highest delay to determine a buffer interval for the third one of the backhaul links; and
   transmitting the forward frame over the third one of the backhaul links after the determined buffer interval.

6. The method of claim 1 wherein the forward call traffic is in a first format, and further comprising:
   converting the forward call traffic from the first format to a second format before transmitting the forward call traffic to at least one of the base stations.

7. The method of claim 6 wherein the first format comprises a proprietary format and the second format comprises an Inter-vendor Operating System (IOS) format.

8. A traffic processing unit adapted to synchronize forward call traffic over backhaul links, the traffic processing unit comprising:
   a reverse traffic processor adapted to receive reverse call traffic over a plurality of backhaul links from a plurality of base stations serving a mobile device; and
   a forward traffic processor adapted to process the reverse call traffic to determine a differential delay in receiving the reverse call traffic over the backhaul links;
   the forward traffic processor further adapted to receive forward call traffic, and to transmit the forward call traffic over the backhaul links to the base stations based on the differential delay determined for the reverse call traffic to substantially synchronize receipt of the forward call traffic at the base stations.

9. The traffic processing unit of claim 8 wherein the forward traffic processor is further adapted to:
   process a receipt time of a reverse frame in the reverse call traffic for each of the backhaul links; and
   determine a delay for each of the backhaul links based on the receipt times of the reverse frame.

10. The traffic processing unit of claim 9 wherein the forward traffic processor is further adapted to:
    identify a forward frame in the forward call traffic; and
    transmit the forward frame over a first one of the backhaul links having the highest delay.

11. The traffic processing unit of claim 10 wherein the forward traffic processor is further adapted to:
    identify a second one of the backhaul links having the next highest delay;
    calculate a difference between the delay of the first one of the backhaul links having the highest delay and the delay of the second one of the backhaul links having the next highest delay to determine a buffer interval for the second one of the backhaul links; and
    transmit the forward frame over the second one of the backhaul links after the determined buffer interval.

12. The traffic processing unit of claim 11 wherein the forward traffic processor is further adapted to:
    identify a third one of the backhaul links having the third highest delay;
    calculate a difference between the delay of the first one of the backhaul links having the highest delay and the delay of the third one of the backhaul links having the third highest delay to determine a buffer interval for the third one of the backhaul links; and
    transmit the forward frame over the third one of the backhaul links after the determined buffer interval.

13. The traffic processing unit of claim 8 wherein the forward call traffic is in a first format, and further comprising a translator system adapted to convert the forward call traffic from the first format to a second format before the forward call traffic is transmitted to at least one of the base stations.

14. The traffic processing unit of claim 13 wherein the first format comprises a proprietary format and the second format comprises an Inter-vendor Operating System (IOS) format.

15. A communication network, comprising:
    a plurality of base stations;
    a traffic processing unit; and
    a plurality of backhaul links connecting the base stations to the traffic processing unit;
    the traffic processing unit adapted to receive reverse call traffic over the backhaul links from the base stations serving a mobile device;
    the traffic processing unit further adapted to process the reverse call traffic to determine a differential delay in receiving the reverse call traffic over the backhaul links, to receive forward call traffic from a core network, and to transmit the forward call traffic over the backhaul links to the base stations based on the differential delay determined for the reverse call traffic to substantially synchronize receipt of the forward call traffic at the base stations.

16. The communication network of claim 15 wherein the traffic processing unit is further adapted to:
process a receipt time of a reverse frame in the reverse call traffic for each of the backhaul links; and
determine a delay for each of the backhaul links based on the receipt times of the reverse frame.

17. The communication network of claim 16 wherein the traffic processing unit is further adapted to:
identify a forward frame in the forward call traffic; and
transmit the forward frame over a first one of the backhaul links having the highest delay.

18. The communication network of claim 17 wherein the traffic processing unit is further adapted to:
identify a second one of the backhaul links having the next highest delay;
calculate a difference between the delay of the first one of the backhaul links having the highest delay and the delay of the second one of the backhaul links having the next highest delay to determine a buffer interval for the second one of the backhaul links; and
transmit the forward frame over the second one of the backhaul links after the determined buffer interval.

19. The communication network of claim 18 wherein the forward traffic processor is further adapted to:
identify a third one of the backhaul links having the third highest delay;
calculate a difference between the delay of the first one of the backhaul links having the highest delay and the delay of the third one of the backhaul links having the third highest delay to determine a buffer interval for the third one of the backhaul links; and
transmit the forward frame over the third one of the backhaul links after the determined buffer interval.

20. The communication network of claim 15 wherein the forward call traffic is in a first format, and wherein the traffic processing unit is further adapted to convert the forward call traffic from the first format to a second format before transmitting to at least one of the base stations.

* * * * *